(12) United States Patent
Kosby et al.

(10) Patent No.: US 9,061,178 B1
(45) Date of Patent: Jun. 23, 2015

(54) BOWLING BALL AND METHODS OF MANUFACTURING SAME UTILIZING ONE OR MORE SACRIFICIAL MOLDS

(75) Inventors: Jason Kosby, Clarksville, TN (US); Randy Schickert, Hopkinsville, KY (US); Randy Teitloff, Paducah, KY (US)

(73) Assignee: Ebonite Holdings, Inc., Hopkinsville, KY (US)

( * ) Notice: Subject to any disclaimer, the term of this patent is extended or adjusted under 35 U.S.C. 154(b) by 115 days.

(21) Appl. No.: 13/473,810

(22) Filed: May 17, 2012

(51) Int. Cl.
*A63B 37/04* (2006.01)
*A63B 37/00* (2006.01)
*B29C 70/70* (2006.01)

(52) U.S. Cl.
CPC ............. *A63B 37/0001* (2013.01); *B29C 70/70* (2013.01)

(58) Field of Classification Search
USPC ............ 473/125, 126; 249/63, 64, 83, 95, 96, 249/125, 175, 177; 425/464, 465, 466, 467
See application file for complete search history.

(56) References Cited

U.S. PATENT DOCUMENTS

| | | | |
|---|---|---|---|
| 2,291,738 A | | 8/1942 | Luth et al. |
| 3,202,742 A | * | 8/1965 | Bachelder et al. ............... 264/74 |
| 3,208,750 A | | 9/1965 | Firth et al. |
| 3,248,113 A | | 4/1966 | Baggenstoss et al. |
| 3,256,018 A | | 6/1966 | Baggenstoss |
| 3,270,108 A | | 8/1966 | Randolph |
| 3,340,342 A | | 9/1967 | Kane et al. |
| 3,350,252 A | | 10/1967 | Twickler |
| 3,353,825 A | | 11/1967 | Bach |
| 3,810,619 A | | 5/1974 | Taylor |
| 3,918,863 A | * | 11/1975 | Rhodes, Jr. .................... 425/117 |
| 4,157,805 A | * | 6/1979 | Haber et al. ..................... 249/91 |
| 4,328,967 A | * | 5/1982 | Orlando et al. ............... 473/125 |
| 4,353,850 A | | 10/1982 | MacDonald |
| 5,098,096 A | * | 3/1992 | Gentiluomo .................. 473/125 |
| 5,238,245 A | * | 8/1993 | Sposato ........................ 473/126 |
| RE34,614 E | * | 5/1994 | Gentiluomo .................. 473/126 |
| 5,542,660 A | * | 8/1996 | Di Cione ....................... 473/596 |
| 5,833,548 A | * | 11/1998 | Ellis et al. ..................... 473/125 |
| 2007/0275787 A1 | | 11/2007 | Bouchard et al. |
| 2009/0023508 A1 | * | 1/2009 | Sposato ........................ 473/126 |

* cited by examiner

*Primary Examiner* — William Pierce
(74) *Attorney, Agent, or Firm* — Wyatt, Tarrant & Combs, LLP; Matthew A. Williams; Stephen C. Hall

(57) ABSTRACT

A bowling ball wherein one or more sacrificial molds are encapsulated in said bowling ball and methods for manufacturing same.

3 Claims, 13 Drawing Sheets

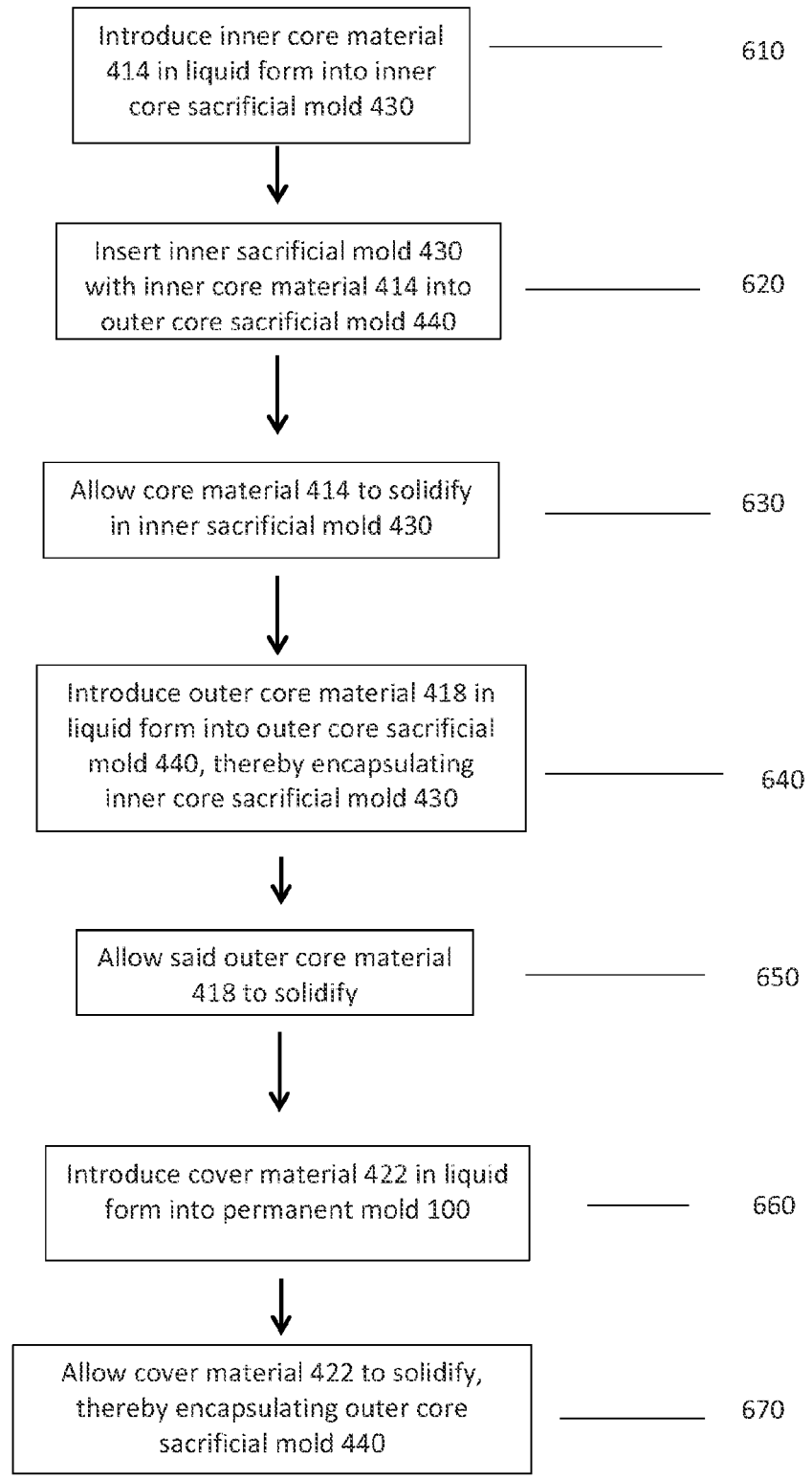

BOWLING BALL AND METHODS OF MANUFACTURING SAME UTILIZING ONE OR MORE SACRIFICIAL MOLDS

CROSS-REFERENCE TO RELATED APPLICATIONS

Not Applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention generally relates to bowling balls and methods for manufacturing same, and more specifically to bowling balls that include one or more sacrificial mold cores 2. General Background of the Invention For many years, it has been known in the art that bowling balls having an inner core with a different density from the coverstock can be designed with certain beneficial inertial and other characteristics such as top weight and pin distance. Also having a core formed from a different material than the cover provides for the manufacture of a more economical bowling ball because the materials used for the cover of bowling balls are typically more expensive than the core material. It has been further known that bowling balls having multi-density core portions encapsulated within cover stock can provide additional benefits to the design of the inertial and other characteristics of bowling balls.

The downside to forming such bowling balls is that, until now, the core portions of such bowling balls had to be formed in a separate molding process, requiring additional equipment and labor. Once such core portions have been produced, they are placed into work-in-process ("WIP") inventory, thereby increasing the working capital cost of the manufacturer. When the pre-molded core portions are used, they must first be fixtured and provided with bores before being placed on one or more locating pins in the mold used to form the bowling ball around the core portion(s).

The object of this invention is, therefore, to provide a bowling ball having one or more distinct core portions surrounded by a cover that can be formed in a continuous manufacturing process by incorporating one or more sacrificial mold cores into the bowling ball.

SUMMARY OF THE INVENTION

A bowling ball wherein one or more sacrificial molds are encapsulated in said bowling ball and methods for manufacturing same.

BRIEF DESCRIPTION OF THE DRAWINGS

For a further understanding of the nature, objects, and advantages of the present invention, reference should be had to the following detailed description, read in conjunction with the attached figures, wherein like reference numerals denote like elements and wherein:

FIG. 16—a flow chart showing steps of a method of manufacturing a bowling ball with at least two sacrificial mold cores encapsulated in said bowling ball.

DETAILED DESCRIPTION OF THE INVENTION

Figure 1:
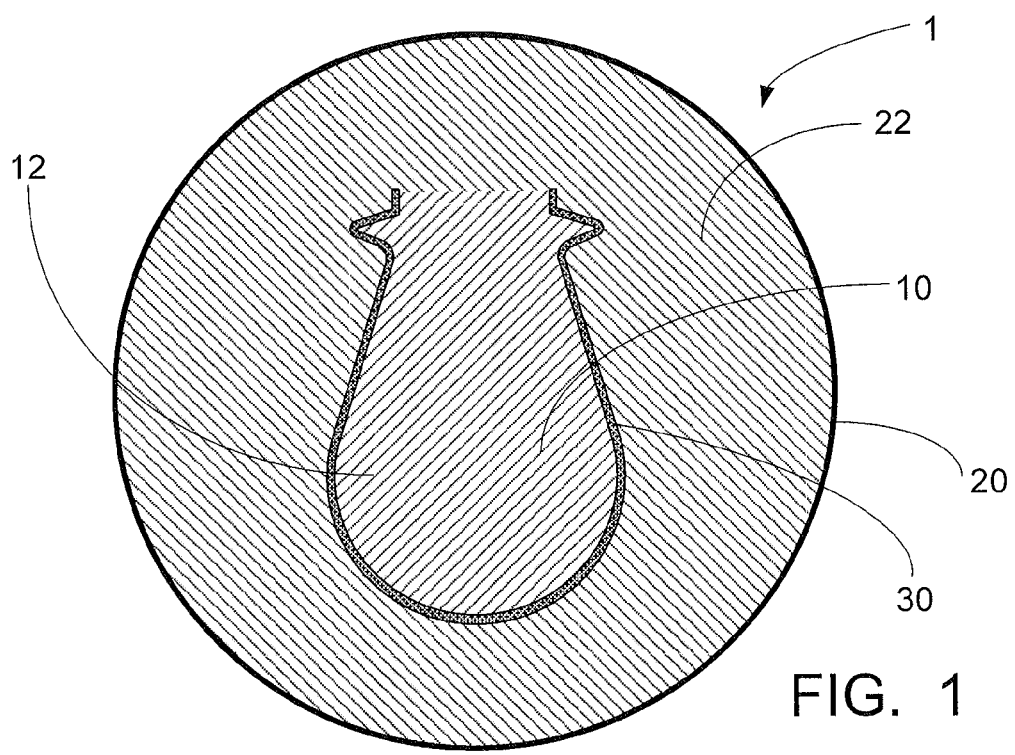
FIG. 1—A cross-sectional view of an embodiment of the invention.

Illustrated in FIG. 1 is an embodiment of the present invention wherein bowling ball 1 comprises core 10, sacrificial mold 30, and cover 20. Bowling ball 1 may be formed by placing sacrificial mold 30 into permanent mold 100. Core 10 is then formed by introduce core material 12 in a liquid form into sacrificial mold to form the core 10. Introducing coverstock in a liquid form into permanent mold 100 once core material 12 has obtained such consistency that core material 12 will not mix with coverstock 22. Once coverstock 22 has cured for a sufficient period of time, which may vary due to the particular composition of coverstock 22 as will be determinable by one of ordinary skill in that art, bowling ball 1 is removed from permanent mold 100 and further processed in the same manner as bowling balls of known construction.

Core 10 will generally be surrounded by sacrificial mold 30. It should, however, be noted that sacrificial mold 30 includes pour opening 32; accordingly, the portion of core 10 aligned with pour opening 32 will not be surrounded by sacrificial mold 30. Nevertheless, for purposes of this patent, core 10 will be referred to as being "encapsulated" by sacrificial mold 30. Similarly, as discussed in further detail below, sacrificial mold 30 may include protrusions, legs, or other structures to support sacrificial mold 30 against the inner surface of permanent mold 100, preventing cover 20 from surrounding the portions of sacrificial mold 30 in contact with the inner surface of permanent mold 100. Nevertheless, for purposes of this patent, sacrificial mold 30, as well as other sacrificial molds discussed below, will be referred to as being "encapsulated" by the relevant surrounding material.

Figure 2:
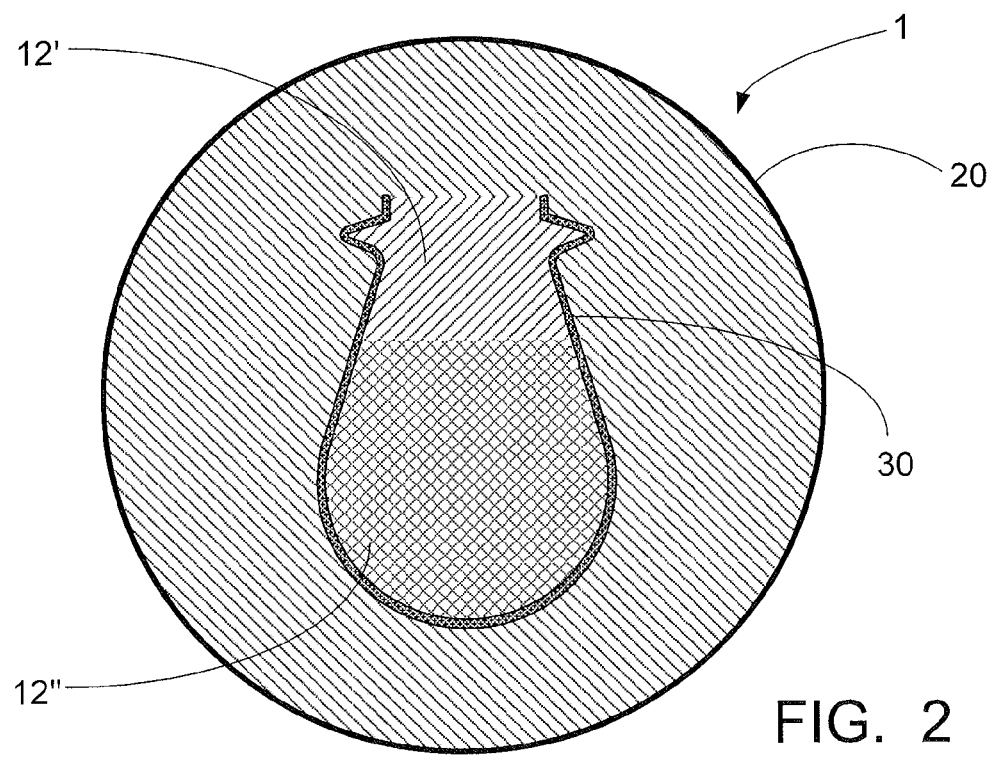
FIG. 2—A cross-sectional view of a second embodiment of the invention.
Figure 3:
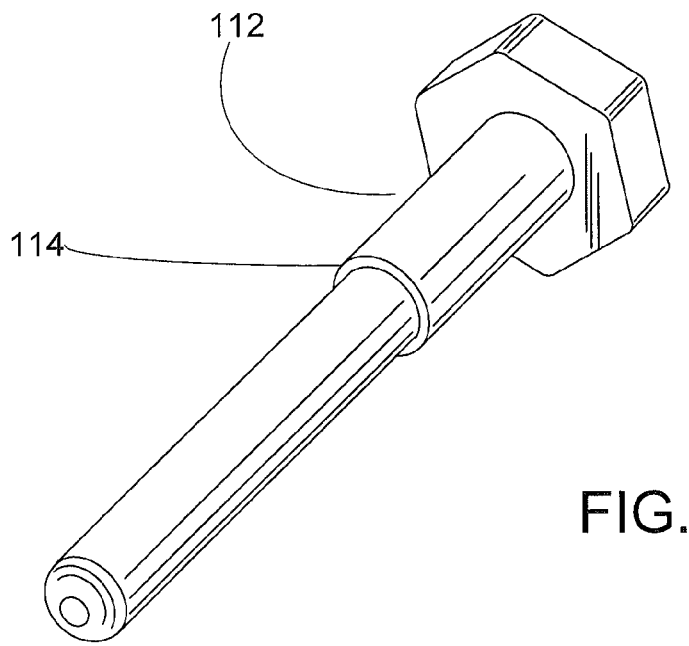
FIG. 3—An illustration of an embodiment of a locator pin that can be used in the manufacturing process for an embodiment of the invention.
Figures 4A, 4B:
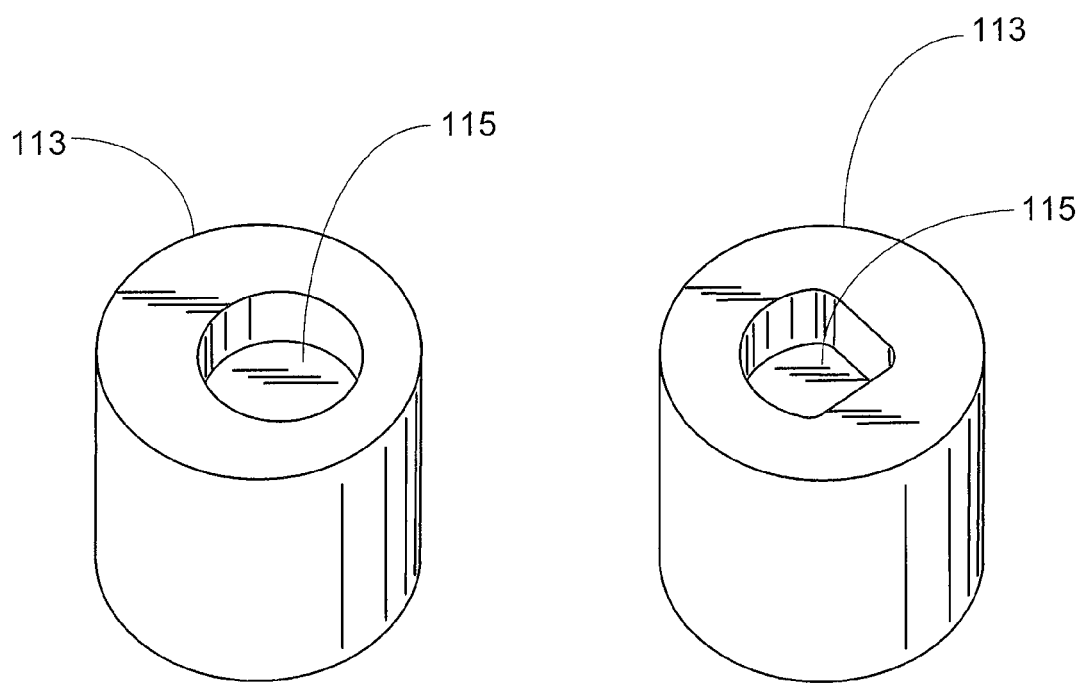
FIG. 4—An illustration of two embodiments of a bushing that can be used in the manufacturing process for an embodiment of the invention.
Figure 5:
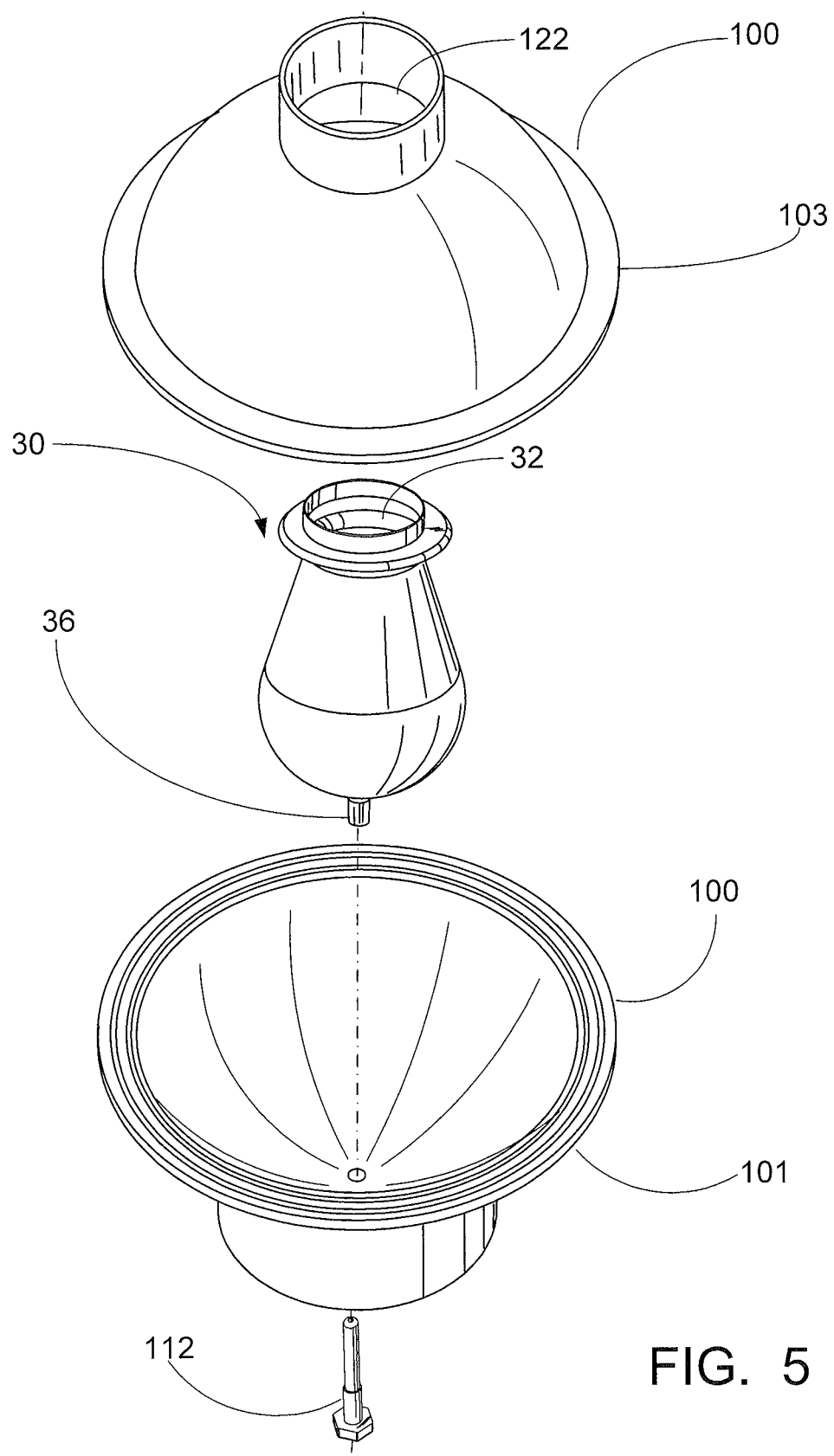
FIG. 5—an exploded view of an embodiment of an apparatus that can be used in the manufacturing process for an embodiment of the invention, including an embodiment of a sacrificial mold.
Figure 6:
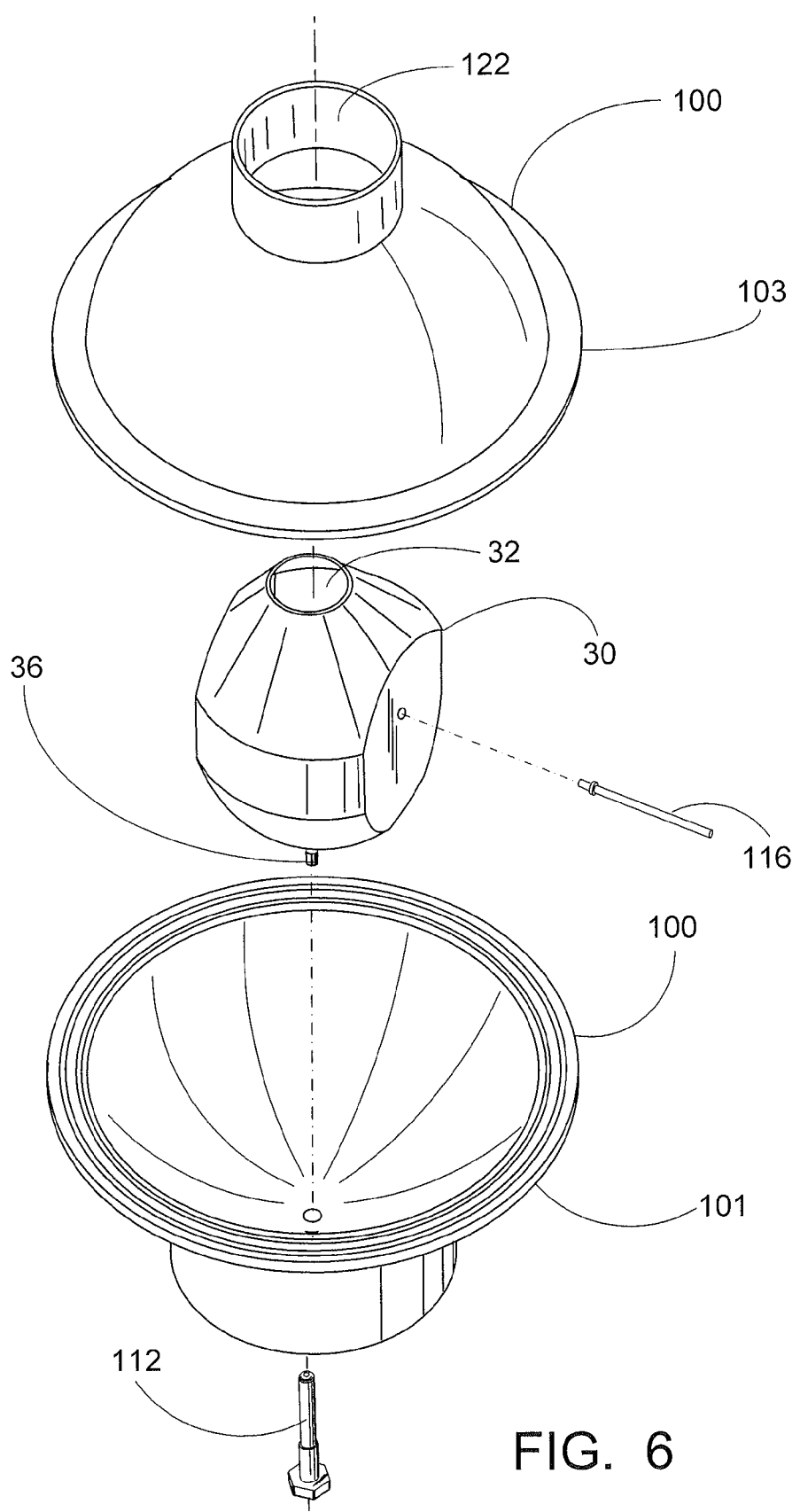
FIG. 6—an exploded view of an alternate embodiment of an apparatus that can be used in the manufacturing process for an embodiment of the invention, including an embodiment of a sacrificial mold.
Figure 7:
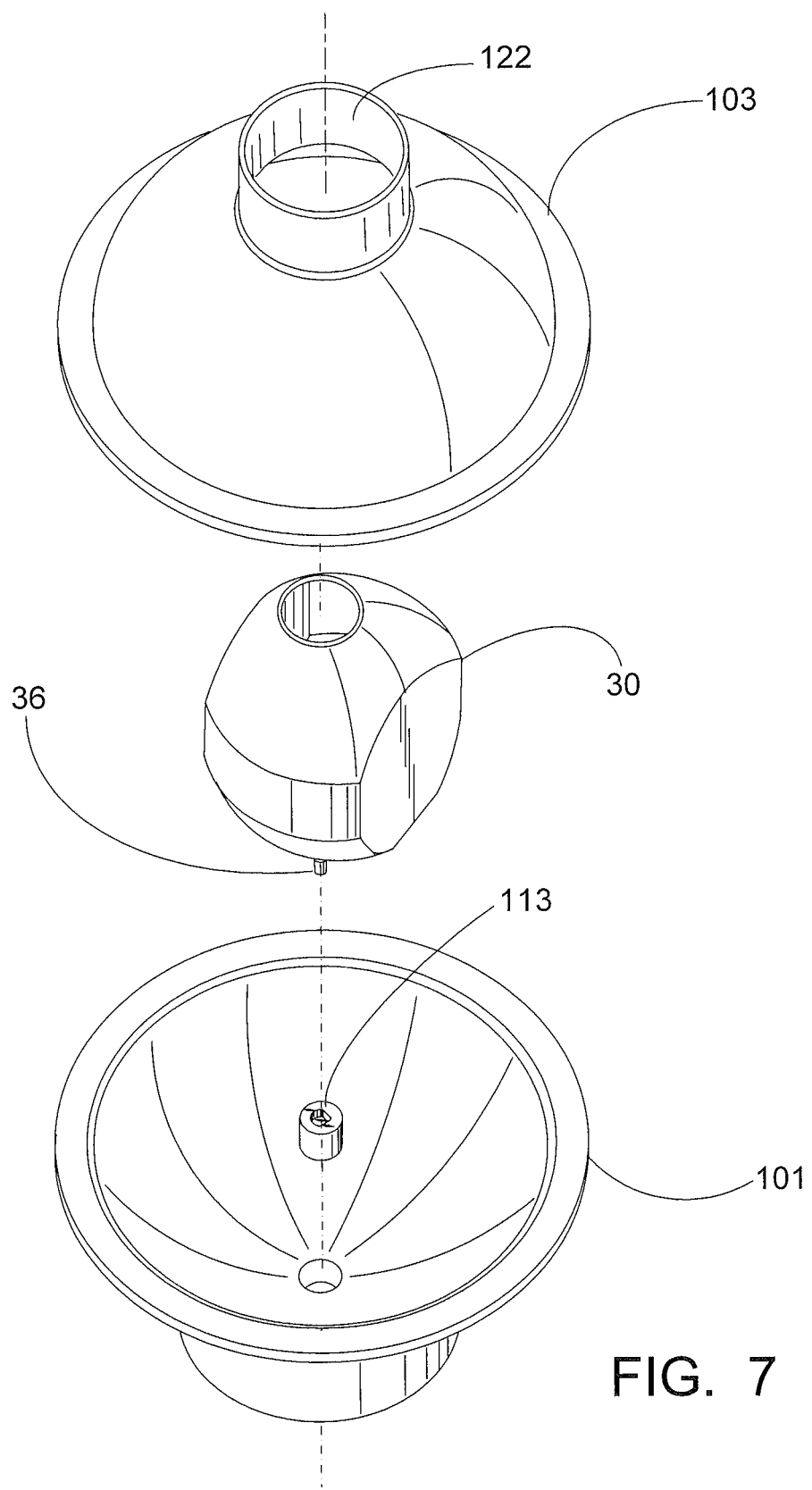
FIG. 7—an exploded view of an alternate embodiment of an apparatus that can be used in the manufacturing process for an embodiment of the invention, including an embodiment of a sacrificial mold.
Figure 8:
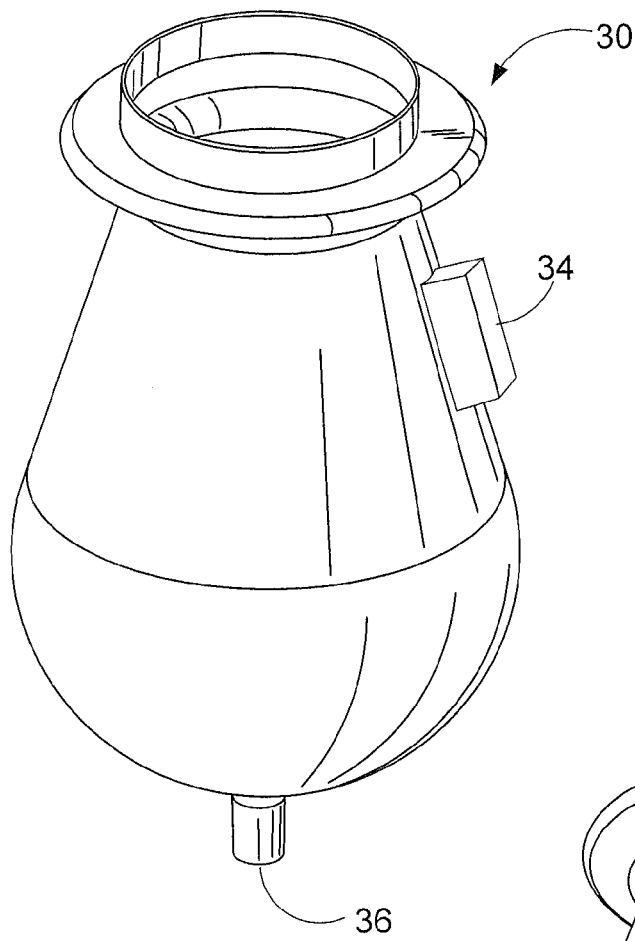
FIG. 8—an illustration of an alternate embodiment of a sacrificial mold.
Figure 9:
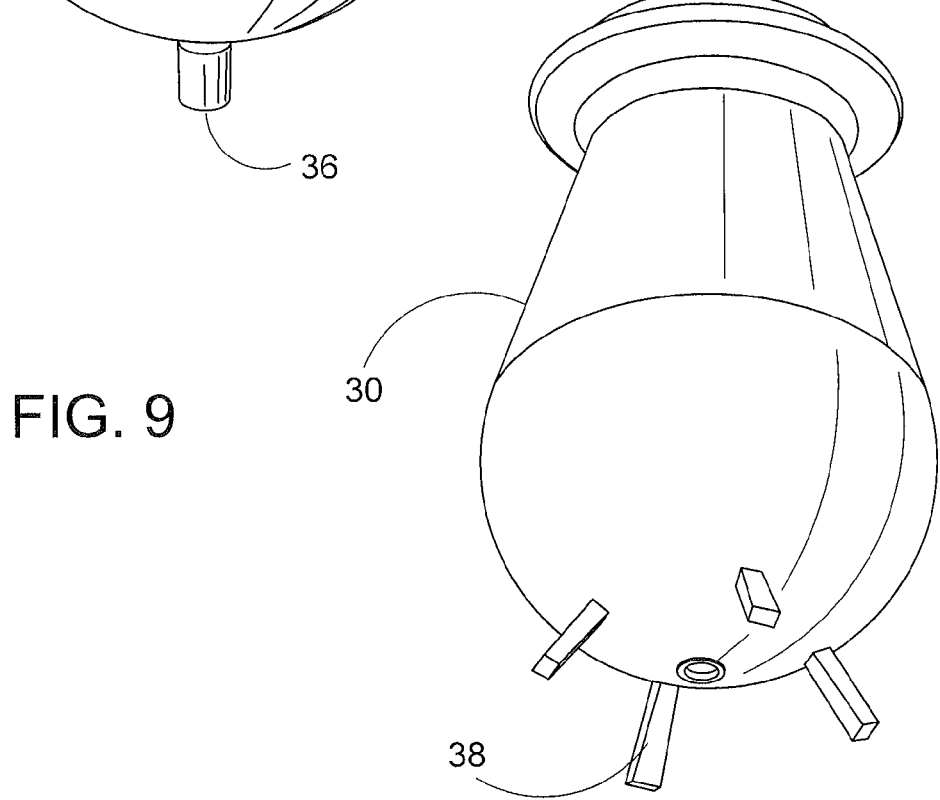
FIG. 9—an illustration of an alternate embodiment of a sacrificial mold.

To provide bowling ball 1 with the desired performance characteristics, including inertial and other properties such as top weight and pin distance, that are determined by the distribution of the mass of bowling ball 1 within its outer surface, sacrificial mold 30 can take on a variety of sizes and shapes (exemplary forms appear in the various figures). In addition, in certain configurations, such as those illustrated in FIG. 2, sacrificial mold 30 can be filled with a plurality of core materials 12 (indicated in FIG. 2 as 12' and 12"). This allows for the design of bowling balls 1 with varying internal mass distribution, each of which provides different performance characteristics, while using a single design for sacrificial mold 30. Sacrificial mold 30 can also be provided with one or more weight blocks 34, as shown in FIG. 8. As with the use of a plurality of core materials 12, weight blocks 34 enable the design of a bowling ball with different performance characteristics while using a single design for sacrificial mold 30.

Sacrificial mold 30 preferably comprises a polymeric material. In a particular, non-limiting embodiment, sacrificial mold 30 is formed from HIPS (high impact polystyrene) using a blow molding process. The material chosen for sacrificial mold 30 will preferably bond with core material 12 and coverstock 22. The bond may be chemical, mechanical, or a combination thereof. In certain applications, an adhesion promoter such as XIM Plastics Adhesion Promoter may be used to enhance the bonding of sacrificial mold 30 to core material 12 and coverstock 22.

Weight blocks 34 may be affixed to an external portion of sacrificial mold 30, affixed to an internal portion of sacrificial mold 30, or incorporated in sacrificial mold 30 when sacrificial mold 30 is formed. In any event, weight blocks 34 are considered to be a part of sacrificial mold 30 and are encapsulated within cover 20 as part of sacrificial mold 30.

In addition to being formed in the shape needed to provide bowling ball 1 with the desired performance characteristics, sacrificial mold 30 must be capable of being located within permanent mold 100 at a specific position and orientation before being filled with core material 12. In contrast to the prior art manufacturing process, this enables bowling ball 1 to be formed in a single, continuous manufacturing process that does not require the storage of finished cores or the drilling of bores in a previously molded cores. This is accomplished by first locating sacrificial mold 30 in the tower portion 101 of permanent mold 100. Sacrificial mold 30 is then filled by pouring core material 12 into sacrificial mold 30 through pour opening 32 defined in sacrificial mold 30. Upper portion 103 of permanent mold 100 is then affixed to lower portion 101 of permanent mold 100. Once core material 12 has set, coverstock 22 in a liquid form is introduced through pour hole 122 defined in permanent mold 100 to form cover 20. Bowling ball 1 is then held in permanent mold 100 until coverstock 22 has set. Bowling ball 1 is then processed in the same manner as a bowling ball formed using the (prior art process.

Alternatively, sacrificial mold 30 can be fully enclosed in permanent mold 100 such that pour opening 32 defined in sacrificial mold 30 aligns with pour hole 122 defined in permanent mold 100. Sacrificial mold 30 is then filled by pouring core material 12 through pour hole 122 defined in permanent mold 100 and pour opening 32 defined in sacrificial mold 30. A fill tube (not shown) may be used to facilitate the introduction of core material 12 into sacrificial mold 30. Once core material 12 has set, coverstock 22 in a liquid form is introduced through pour hole 122 defined in permanent mold 100 to form cover 20. Bowling ball 1 is then held in permanent mold 100 until coverstock 22 has set. Bowling ball 1 is then processed in the same manner as a bowling ball formed using the prior art process.

Sacrificial mold 30 may be affixed within permanent mold 100 using one or more of the following techniques depending on the shape of sacrificial mold 30 and the desired placement of core 10 within bowling ball 1. In one technique, locator pin 112 extends upward from lower half 101 of permanent mold 100 and into the cavity defined by permanent mold 100. Sacrificial mold 30 is then placed onto locator pin 112 such that a portion of locator pin 112 extends into the cavity defined by sacrificial mold 30. Once core material 12 has set, core material 12 surrounds the portion of locator pin 112 extending into the cavity defined by sacrificial mold 30, thereby locking sacrificial mold 30 and core 10 into place within permanent mold 100. Locator pin 112 may be tapered to facilitate the removal of bowling ball 1 from permanent mold 100.

In some cases, the performance characteristics of bowling ball 1 will be achieved with the use of a core 10 that is symmetrical about an axis that can be aligned with or parallel to locator pin 112 and can rest against the bottom surface of permanent mold 100. In such a design, locator pin 112 alone is sufficient to achieve proper placement of sacrificial mold 30 and core 10 within bowling ball 1. It should be noted that in such a design (as well as other designs where portions of sacrificial mold 30, such as stem 36 or legs 38, are provided to support sacrificial mold 30 against the inner surface of permanent mold 100) cover 20 may not completely surround sacrificial mold 30.

Where achieving the desired performance characteristics of bowling ball 1 requires sacrificial mold 30 to be spaced apart from permanent mold 100, sacrificial mold 30 may be formed with stem 36 that is hollow and sized and oriented to accept locator pin 112. Stem 36 positions sacrificial mold 30 at the appropriate location within the cavity defined by permanent mold 100 such that core 10 ends up at the desired location within bowling ball 1. Alternatively, locator pin 112 may include shoulder 114 to hold sacrificial mold 30 the required distance from the interior surface of permanent mold 100. In yet another alternative, bushing 113 could be installed to permanent mold 100 allowing stem 36, which may be solid in this embodiment, to be inserted to a specific depth.

In any case, sacrificial mold 30 may also include one or more legs 38 extending outward from sacrificial mold 30 to support sacrificial mold 30 and locate core 10 in the desired location within the cavity defined by permanent mold 100.

When core 10 is asymmetric, meaning that it is not symmetrical to an axis that is coexistent with or parallel to the longitudinal axis of locator pin 112, or as otherwise required, orientation pin 116 can be used to fix and identify the orientation of core 10 within bowling ball 1. As with locator pin 112, orientation pin 116 extends into the cavity defined by permanent mold 100. Orientation pin 116 is, however, preferably located closer to the parting line where lower half 101 of permanent mold 100 and upper half 103 of permanent mold 100 mate, such that orientation pin 116 extends into the cavity defined by permanent mold 100 along an axis that intersects the axis that extends longitudinally through locator pin 112. As with locator pin 112, orientation pin 116 may be tapered. Orientation pin 116 may also include a shoulder to prevent orientation pin 116 from being inserted too far into sacrificial mold 30. Orientation pin 116 may also be a sacrificial part that is molded into bowling ball 1.

As an alternative to the combination of locator pin 112 and orientation pin 116, recess 115 in bushing 113 can be provided with the appropriate offset to allow sacrificial mold 30 to be placed wherever needed within permanent mold 100. To confirm the orientation of an asymmetric core 10 once it is in encapsulated in cover 20, recess 115 in bushing 113 and stem 36 can be keyed to mate with one another such that the void resulting from the molding of coverstock 22 around stem 36 will reveal the orientation of sacrificial mold 30 and core 10 once bowling ball 1 is removed from permanent mold 100.

Since bowling balls come in a variety of weights while having the same outer circumference, core material 12 must be varied in density between bowling balls 1 having the same design for core 10 and sacrificial mold 30 but different weights (e.g. fourteen, fifteen, or sixteen pounds). The impact of this is that for bowling balls 1 to have the same desired characteristics such as top weight and pin distance across the weight range, the position of sacrificial mold 30 and core 10 within bowling ball 1 must vary with the weight. In manufacturing prior art bowling balls, varying the location of the central core is accomplished by having different fixtures for drilling bores in the pre-molded central cores for different weight bowling balls. By drilling such bores at different locations and depths in the pre-manufactured central core, the pre-manufactured central core can be positioned at different locations within the permanent mold as required by the weight of the finished bowling ball using one or more locating pins.

This known method will not work to form bowling ball 1 since sacrificial mold 30 is not amenable to having a bore drilled in it and the benefits of the continuous manufacturing process would be lost if core 10 were molded in sacrificial mold 30 and placed in inventory for later drilling. One solution is to have a different sacrificial mold 30 for each weight of bowling ball 1 to be made with a specific core 10. This solution, while feasible, would increase the inventory stock-keeping-units ("SKUs") of sacrificial molds 30 and the overall work-in-process inventory, and the possibly slight differences between sacrificial molds 30 used in bowling balls of differing weight with identical geometry for core 10 would increase the potential for loss of production yield due to the use of the wrong sacrificial mold 30 for a given weight of bowling ball 1. Accordingly, it is preferable to vary the location of core 10 as described below.

Where core 10 simply has to move along an axis that is coexistent with or parallel to the longitudinal axis of locator pin 112, or stem 36 where stem 36 is used in connection with bushing 113 instead of locator pin 112, sacrificial mold 30 can be provided with stem 36 having the length needed to position sacrificial mold 30 at the greatest possible required distance. Stem 36 can then be trimmed to the required length to eliminate the need to stock sacrificial molds 30 that vary only in the length of stem 36. If permanent mold 100 includes locator pin 112 having shoulder 114 to support sacrificial mold 30 in the proper location, the location of shoulder 114 can be varied as required either by adjusting locator pin 112 or using locator pins 112 that locate shoulder 114 different distances from permanent mold 100. In yet another alternative, bushing 113 could be installed to permanent mold 100 allowing stem 36 to be inserted to a specific depth; allowing bushings 113 with differing insertion depths, i.e. differing depths of recess 115, to be used to vary the location of sacrificial mold 30 within permanent mold 100. Locator pin 112 could be used in combination with bushing 113.

In a design that requires the location of core 10 to vary in more aspects than just along an axis that is coexistent with or parallel to the longitudinal axis of locator pin 112, the solution becomes more complex. For example, sacrificial mold 30 can be formed with multiple insertion points for receiving locator pin 112 and orientation pin 116, if required. The insertion points can be holes in sacrificial mold 30 that are of sufficiently small diameter that, at most, a negligible amount of core material 12 will pass through the insertion points before core material 12 begins to solidify. Alternatively, the insertion points can be areas of reduced wall thickness in sacrificial mold 30 (e.g. dimples) that an operator can pierce with locator pin 112 and orientation pin 116, if used, when locating sacrificial mold 30 in the cavity of permanent mold 100. In such an embodiment, locator pin 112 and orientation pin 116 may taper to a point to facilitate the piercing of sacrificial mold 30. In an alternate process, recess 115 in bushing 113 can be provided with an offset for changing the location of sacrificial mold 30 relative to the sides of permanent mold 100. When such an offset is combined with the ability to determine the depth to which stem 36 can be inserted into bushing 113, the use of such an offset bushing enables the location of sacrificial mold 30 to be varied in three dimensions. In yet another alternative embodiment, locator pin 112 can be affixed to bushing 113 in an offset location with the same result.

In the case of a sacrificial mold 30 that relies on one or more legs 38 to locate sacrificial mold 30, each of legs 38 can be formed at their maximum length for any given weight of bowling ball 1 for the core 10 defined by sacrificial mold 30. As required for the weight of the bowling ball 1 being produced, each of legs 38 can be trimmed to the length(s) needed to locate sacrificial mold 30 properly before inserting sacrificial mold 30 into permanent mold 100.

Figure 10:
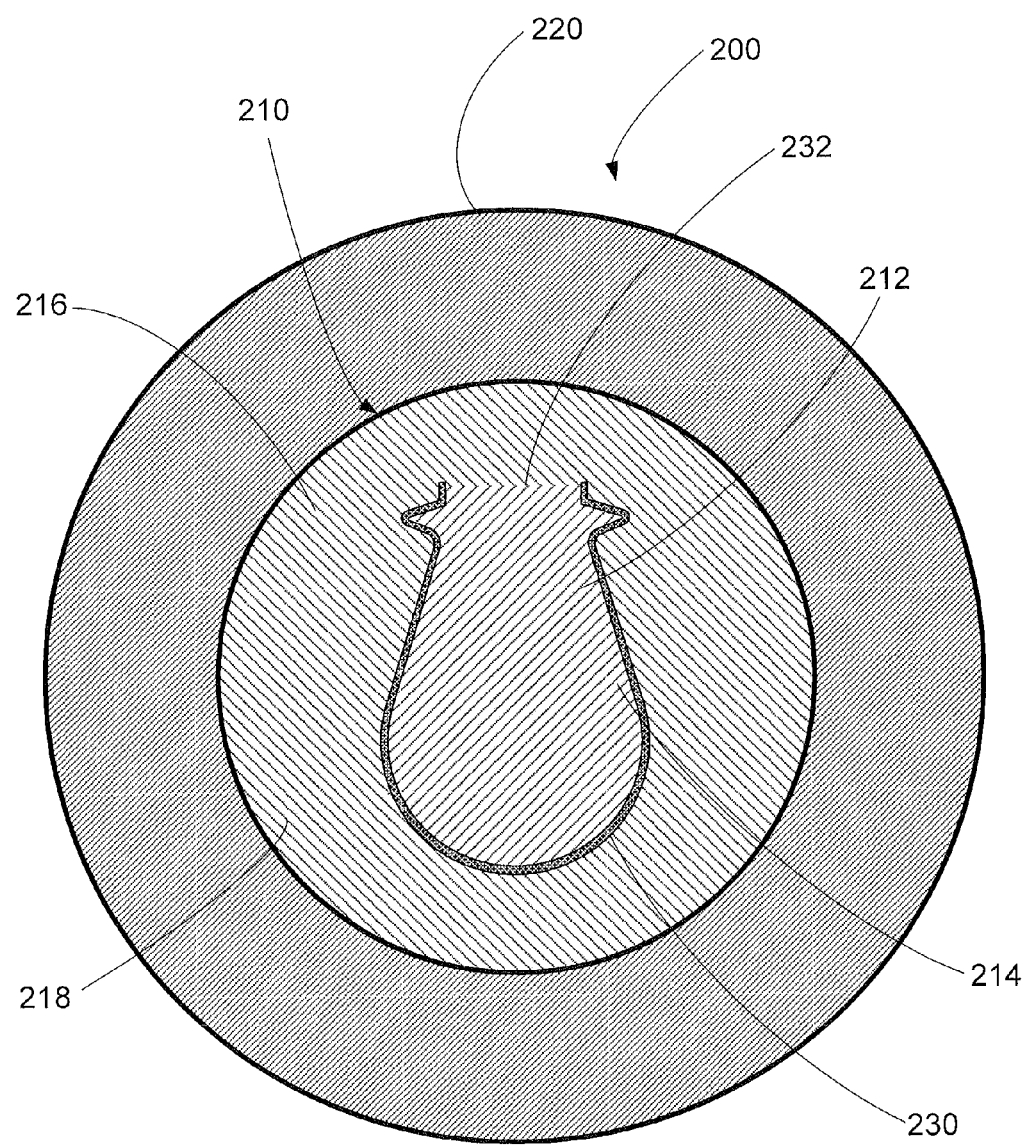
FIG. 10—A cross-sectional view of a third embodiment of the invention.
Figure 11:
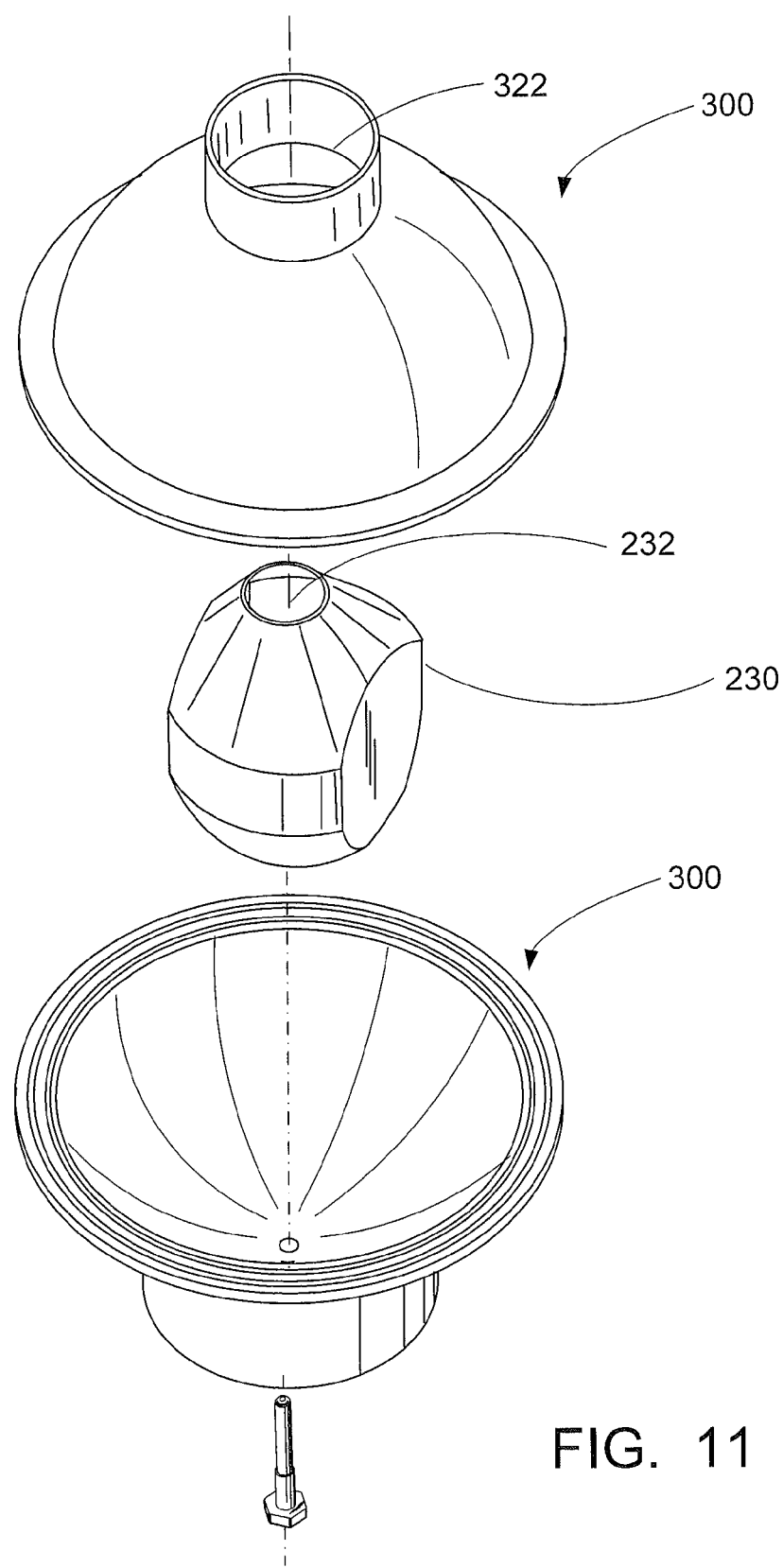
FIG. 11—an exploded view of an embodiment of an apparatus that can be used in the manufacturing process for an embodiment of the invention, including an embodiment of a sacrificial mold.

Referring now to FIGS. 10 and 11, it is frequently desirable for bowling ball 200 to include multi-piece core 210 wherein multi-piece core 210 comprises inner core 212 formed from inner core material 214 that is poured into and encapsulated by sacrificial mold 230. Sacrificial mold 230 is then encapsulated by outer core 216, which is formed from outer core material 218. Multi-piece core 210 is preferably formed by first locating sacrificial mold 230 within permanent mold 300 used to form outer core 216. Similarly to the process for forming bowling ball 1, inner core material 214 in a liquid form is poured into sacrificial mold 230 through pour opening 322 defined in permanent mold 300 and into or adjacent to pour opening 232 defined in sacrificial mold 230. Once inner core material 214 has set sufficiently to avoid inner core material 214 from mixing with outer core material 218, outer core material 218 in liquid form is introduced into permanent mold 300 via pour opening 322. Optionally a fill tube (not shown) may be used to facilitate the introduction of inner core material 214 into sacrificial mold 230. In an alternative manufacturing process, the upper half of permanent mold 300 can be installed after sacrificial mold 230 has been filled.

In one embodiment utilizing multi-piece core 210, outer core 216 is formed in permanent mold 300. In this embodiment, inner core 212 is formed in sacrificial mold 230 that is located in permanent mold 300 using one or more of the same techniques used to locate sacrificial mold 30 in permanent mold 100 that were discussed above with respect to bowling ball 1. As with sacrificial mold 30 that is incorporated in bowling ball 1, sacrificial mold 230 may include one or more weight blocks analogous to weight block 34 shown in FIG. 8. Once multi-piece core 210 is formed, it is then processed in accordance with known techniques for forming a bowling ball with a pre-formed core. Bowling ball 200, when finished, comprises inner core 212, which is encapsulated by sacrificial mold 230, which is in turn encapsulated by outer core 216, which is in turn encapsulated by cover 220.

Figure 12:
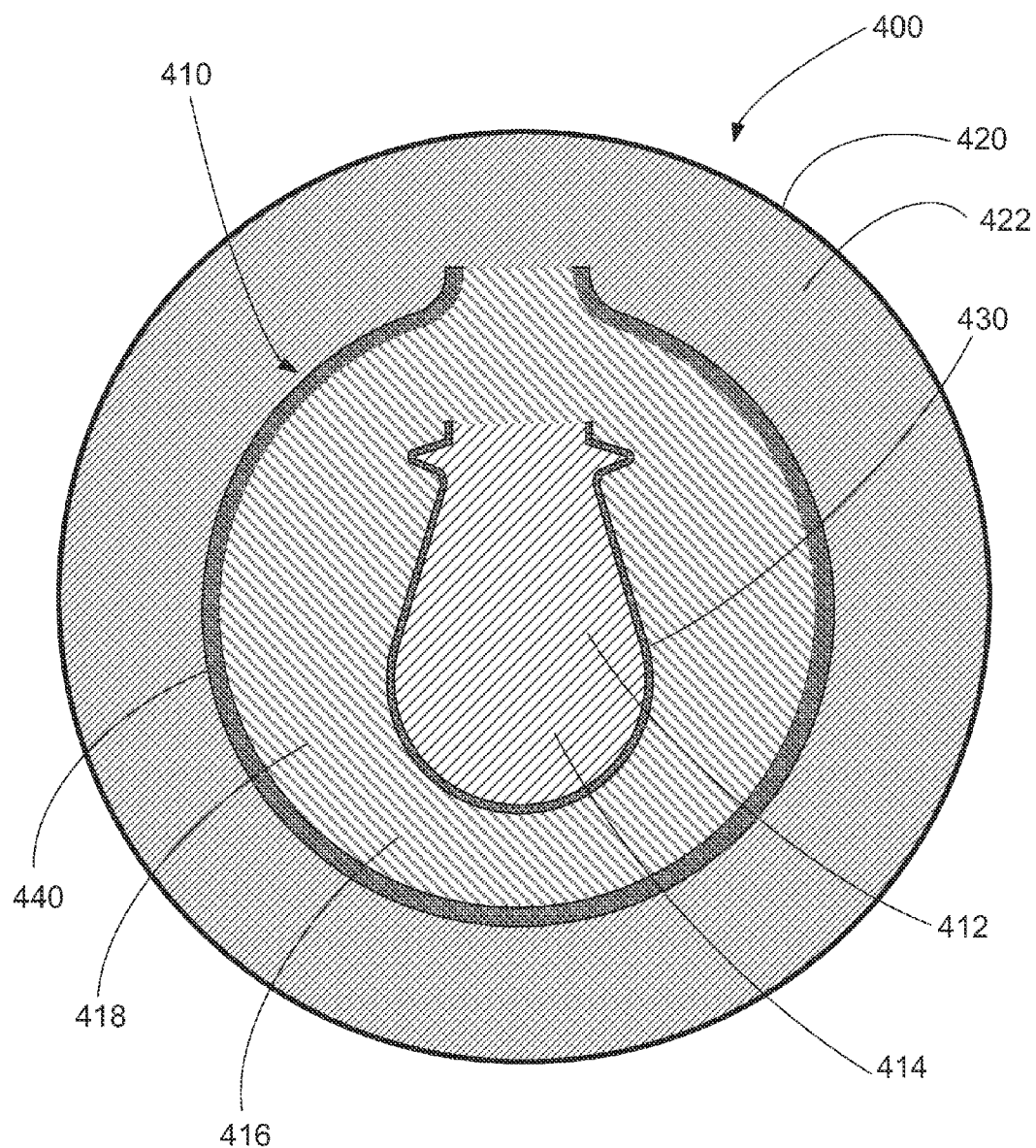
FIG. 12—A cross-sectional view of a fourth embodiment of the invention the includes more than one sacrificial mold.

Referring now to FIG. 12, bowling ball 400 comprises multi-piece core 410, which further comprises inner core 412, inner-core sacrificial mold 430, outer core 416, and outer-core sacrificial mold 440, and cover 420. Inner core 412 is encapsulated in inner-core sacrificial mold 430, which is encapsulated in outer core 416, which is encapsulated in outer-core sacrificial mold 440, which is encapsulated in cover 420. This is accomplished by installing inner-core sacrificial mold 430 in outer-core sacrificial mold 440 such that inner core 412 will be located in the correct position relative to outer core 416. Sacrificial mold 440 is installed in permanent mold 500 such that outer core 416 will be located in the correct position relative to cover 420. As with the prior embodiments, bowling ball 400 may include one or more weight blocks and said weight blocks may be formed with one or both of the sacrificial molds.

Figure 13:
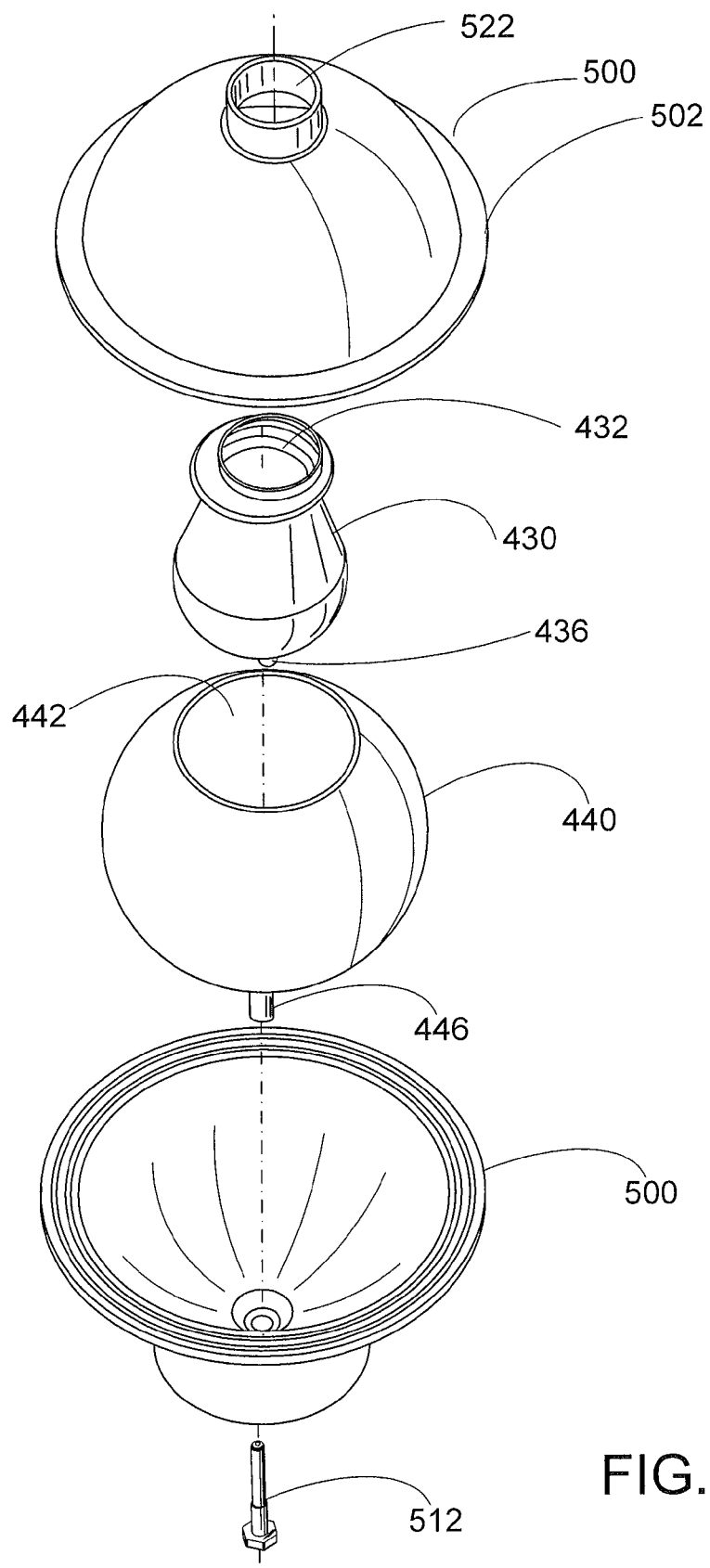
FIG. 13—an exploded view of an embodiment of an apparatus that can be used in the manufacturing process for an embodiment of the invention incorporating more than one sacrifical mold.

In the embodiment illustrated in FIG. 13, bowling ball 400 is formed by a nested set of molds. Outer-core sacrificial mold 440 is installed in permanent mold 500 using stem 446 to engage locator pin 512 similarly to the installation of sacrificial mold 30 in permanent mold 100. In the illustrated embodiment, pour opening 442 in outer-core sacrificial mold 440 is large enough to facilitate the placement of inner-core sacrificial mold 430 into outer-core sacrificial mold 440. Inner-core sacrificial mold 430 may be installed in outer-core sacrificial mold 440 using stem 436 to engage the portion of locator pin 512 extending into the cavity defined by outer-core sacrificial mold 440.

Bowling ball 400 is then formed by first introducing inner core material 414 into inner-core sacrificial mold 430 by pouring said material through pour opening 522 defined in permanent mold 500, pour opening 442 defined in outer-core sacrificial mold 440 and pour opening 432 defined in inner-core sacrificial mold 430. Once inner core material 414 has set sufficiently to avoid mixing of inner core material 414 and outer core material 418, outer core material 418 is introduced into outer-core sacrificial mold 440 through pour opening 522 defined in permanent mold 500 and pour opening 442 defined in outer-core sacrificial mold 440. A fill tube (not shown) can be used to facilitate the introduction of outer core material 418 into outer-core sacrificial mold 440. Once outer core material 418 has set sufficiently to avoid mixing of outer core material 418 and cover material 422, cover material 422 is introduced into permanent mold 500 through pour opening 522 defined in permanent mold 500. In an alternative manufacturing process, upper half 502 of permanent mold 500 can be installed after the sacrificial molds have been filled.

Figure 14:
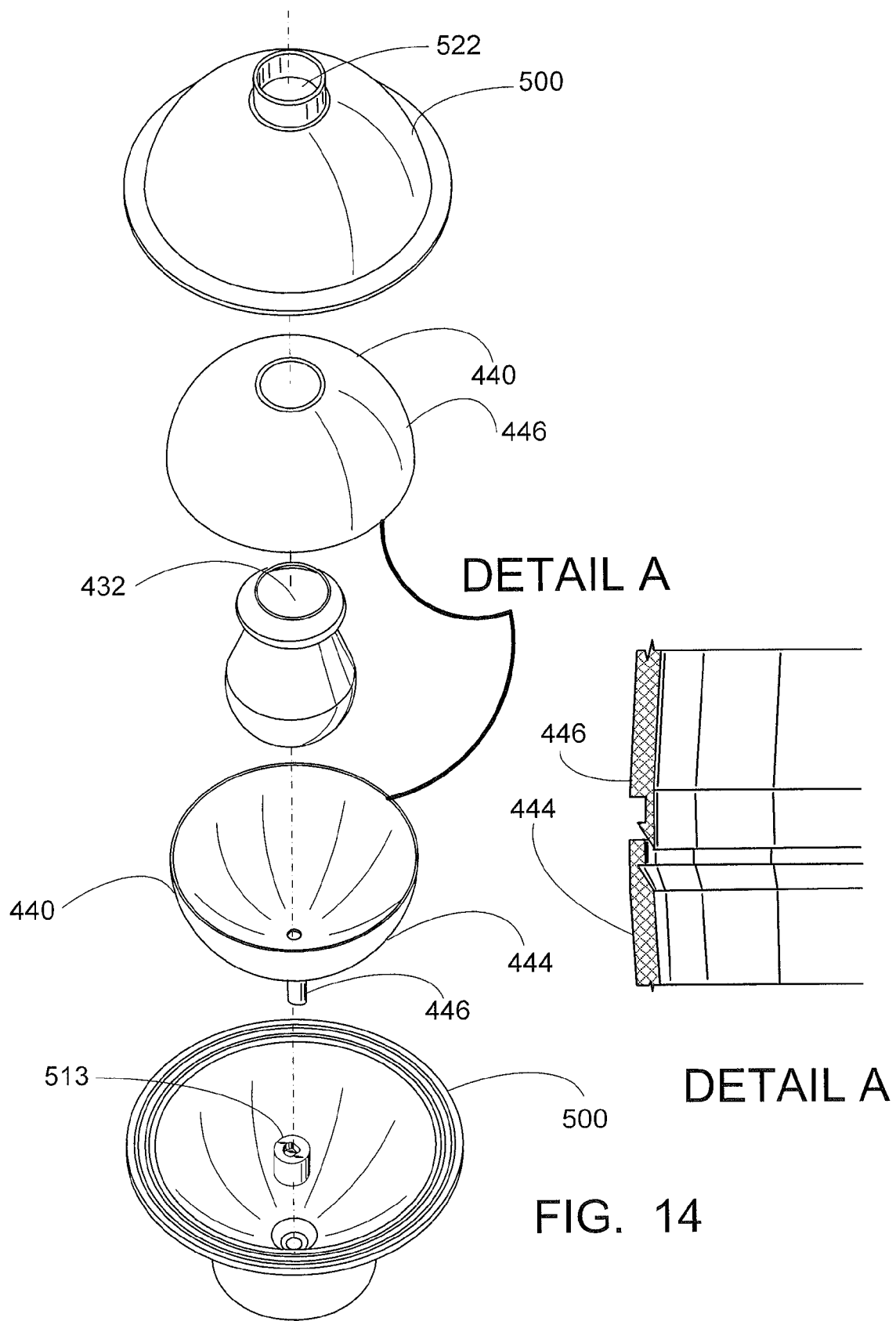
FIG. 14—an exploded view of an embodiment of an apparatus that can be used in the manufacturing process for an embodiment of the invention incorporating more than one sacrifical mold.
Figure 15:
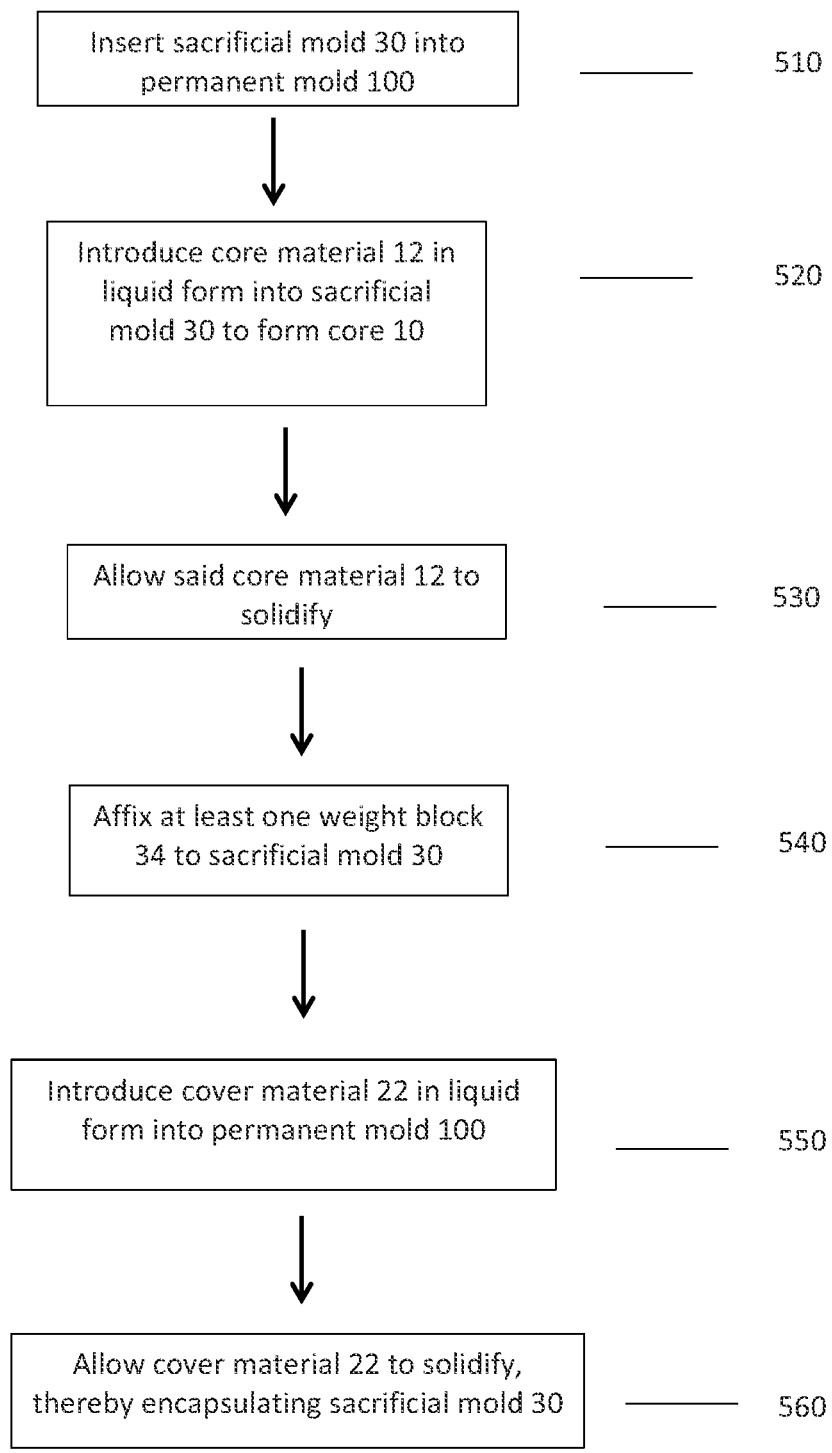
FIG. 15—a flow chart showing steps of a method for manufacturing a bowling ball with a sacrificial mold core encapsulated in said bowling ball.

In the embodiment of the apparatus illustrated in FIG. 14, outer-core sacrificial mold 440 is installed in permanent mold 500 by inserting stem 446 into bushing 513. In such an embodiment, stem 446 may be solid and could be keyed to bushing 513 to provide a specific orientation of outer-core sacrificial mold 440 within permanent mold 500. Inner-core sacrificial mold 430 would then be located in outer-core sacrificial mold 440 using one or more legs 38 designed to rest on the inner surface of outer-core sacrificial mold 440. In this embodiment of the apparatus, outer-core sacrificial mold 440 comprises two pieces. Once inner-core sacrificial mold 430 is placed in lower half 444 of outer-core sacrificial mold 440, upper half 446 of outer-core sacrificial mold 440 is mated with lower half 444 of outer-core sacrificial mold 440. The illustrated embodiment demonstrates use of a snap fit, as shown in detail A of FIG. 14, but any known mating method that will allow the halves to resist separation when outer core material 418 is introduced to outer-core sacrificial mold 440 may be used.

It should be noted that inner-core sacrificial mold 430 could be installed in outer-core sacrificial mold 440 in a number of other manners reasonable within the knowledge of one of ordinary skill in the relevant art. For example, inner-core sacrificial mold 430 could be formed within outer-core sacrificial mold 440 through blow molding or other processes.

The foregoing described embodiments are exemplary in nature and are not intended to limit the scope of the invention.

We claim:

1. A method of manufacturing a bowling ball wherein at least one sacrificial mold core is encapsulated in said bowling ball comprising:
    inserting a sacrificial mold into a permanent mold;
    introducing a core material in liquid form into said sacrificial mold;
    allowing said core material to solidify;
    after introducing the core material into said sacrificial mold, introducing a cover material into said permanent mold, said cover material encapsulating said sacrificial mold;
    allowing said cover material to solidify.

2. A method of manufacturing a bowling ball wherein at least two sacrificial mold cores are encapsulated in said bowling ball comprising:
    inserting a first sacrificial mold into a permanent mold;
    inserting a second sacrificial mold into the first sacrificial mold;
    introducing an inner core material in liquid form into said first sacrificial mold;
    allowing said inner core material to solidify;
    introducing an outer core material in liquid form into said second sacrificial mold, said outer core material encapsulating said first sacrificial mold;
    allowing said second core material to solidify;
    introducing a cover material into said permanent mold, said cover material encapsulating said second sacrificial mold;
    allowing said cover material to solidify.

3. The method of claim 1, further comprising affixing at least one weight block to the sacrificial mold.

* * * * *